United States Patent [19]

Spitzner

[11] 4,237,062
[45] Dec. 2, 1980

[54] SULFONYLTHIOSEMICARBAZIDES, METAL COMPLEXES THEREOF, AND SOLUTIONS CONTAINING SUCH COMPOUNDS FOR USE IN EXTRACTION OF METAL VALUES

[75] Inventor: Ernest B. Spitzner, Minneapolis, Minn.

[73] Assignee: Henkel Corporation, Minneapolis, Minn.

[21] Appl. No.: 40,624

[22] Filed: May 21, 1979

[51] Int. Cl.$^3$ .............................. C07F 3/06; C07F 1/08; C07F 15/04; C07C 159/00
[52] U.S. Cl. .................... 260/438.1; 252/182; 260/429.9; 260/439 R; 260/465 E; 423/24; 423/109; 423/139; 423/DIG. 14; 56/418
[58] Field of Search ............. 260/552 SC, 554, 429.9, 260/438.1, 439 R, 465 E; 423/DIG. 14, 24; 252/182

[56] References Cited

U.S. PATENT DOCUMENTS

| 2,605,262 | 7/1962 | Behnisch et al. ........... 260/552 SC X |
| 3,954,936 | 5/1976 | Shozda ................... 423/DIG. 14 X |
| 4,160,807 | 7/1979 | Virnig et al. ............................ 423/24 |

FOREIGN PATENT DOCUMENTS

| 740443 | 8/1966 | Canada ............................ 260/552 SC |
| 1335993 | 7/1963 | France . |
| 475963 | 9/1969 | Switzerland ............................ 260/554 |
| 1038339 | 8/1966 | United Kingdom ............. 260/552 SC |

OTHER PUBLICATIONS

Hirooka et al., CA 66: 11254f (1963).
Kurihara et al., CA 73: 55770p (1970).

*Primary Examiner*—Thomas A. Waltz
*Attorney, Agent, or Firm*—Patrick J. Span

[57] ABSTRACT

Certain sulfonylthiosemicarbazides, metal complexes thereof and solutions of said compounds in essentially water-immiscible, liquid hydrocarbon solvents are disclosed. The sulfonylthiosemicarbazides have the general structural formula:

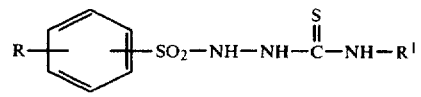

wherein R and R$^1$ are as defined in the specification and claims hereof. Particular metal values are recovered from their aqueous solutions by using sulfonylthiosemicarbazides dissolved in essentially water-immiscible, liquid hydrocarbon solvents. The extraction process involves contacting the metal value containing aqueous solution with the solution of the sulfonylthiosemicarbazide in essentially water-immiscible, liquid hydrocarbon solvent and stripping the metal from the loaded organic phase.

20 Claims, No Drawings

SULFONYLTHIOSEMICARBAZIDES, METAL COMPLEXES THEREOF, AND SOLUTIONS CONTAINING SUCH COMPOUNDS FOR USE IN EXTRACTION OF METAL VALUES

The present invention is directed to novel sulfonylthiosemicarbazides, organic solvent solutions thereof, metal complexes of such sulfonylthiosemicarbazides, organic solvent solutions of such complexes and the method of using said sulfonylthiosemicarbazides to extract metal values from aqueous solution.

Liquid ion exchange recovery of metal values from aqueous solutions thereof has in the past ten years or so become a mature commercial operation. Such processing has been described as being deceptively simple since all that is really happening is the transfer of a metal value from Phase A (aqueous) to Phase B (organic) and thence from Phase B to Phase C (aqueous). However, complexities of liquid ion exchange arise in a number of areas including (1) synthesis and manufacture of the reagent system, (2) evaluation of the system's capabilities and (3) engineering application leading to large scale metal recovery.

The key to a successful application of liquid ion exchange is the reagent. In this respect, the reagent should desirably meet a number of criteria. In the first instance, the reagent should complex with or react with a metal or group of metals and such complexing or reaction should be relatively fast in order to avoid having to use large holding tanks or reaction vessels. It is also desirable that the reagent exhibits preference for a single metal where the aqueous starting solutions contain a number of metal values. Such selectivity can often be optimized at designated pH ranges. The reagent should also desirably complex or react quantitatively with the metal under the extraction conditions. Additionally, the reagent, as well as the resulting metal complex, must exhibit satisfactory solubility in the essentially water-immiscible organic solvent being used. Further, the reagent-metal reaction or complexing should be reversible so that the metal can be stripped from the organic phase. For economic reasons, the reagent should be relatively stable so that it can be recycled repeatedly. Also, it should be essentially water insoluble to prevent significant loss into the aqueous phase or phases. Furthermore, the reagent should not cause or stabilize emulsions. Again and principally for economic reasons, the reagent should not react with or load significant quantities of acid, for example, from aqueous acidic stripping solutions. And, of course, the cost of the reagent should be such that the liquid ion exchange process can be operated at a profit.

Of significant, but lesser, importance, is the selection of the essentially water-immiscible solvent to be used in the liquid ion exchange process. Such selection is important principally from a cost standpoint, especially in the recovery of the more common metals. Existing commercial operations for copper recovery, for example, generally employ aliphatic kerosenes because of the low cost thereof. Thus, the cost of the reagent and the solvent is intertwined in providing the desired overall economics of the process being commercialized.

One of the most extensively used systems in commercial operation in the last decade for copper recovery has employed benzophenoximes or combination reagents including a benzophenoxime component. While being economic, improvements can be made since the said benzophenoximes do not have total selectivity for copper over iron, for example. Other types of reagents which have been proposed for use in copper recovery such as the alkenyl substituted 8-hydroxyquinolines also have certain drawbacks.

It has now been discovered that certain novel sulfonylthiosemicarbazides, as more fully defined hereinafter, are useful in liquid ion exchange recovery processes. The new compounds of the present invention are represented by the following general structural formula:

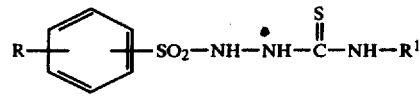

wherein R is an alkyl group containing at least 8 carbon atoms which may be linear or branched chain, generally up to about 20 carbon atoms, and $R^1$ is selected from the group consisting of alkyl, aryl, alkaryl and aralkyl, in which the alkyl groups will generally contain from 1 to 20 carbon atoms and may be liner or branched chain. The aryl group is generally phenyl. Moreover, it is generally preferred that the $R^1$ group in the compounds of the present invention be phenyl or an alkyl group containing at least 8 carbon atoms.

The compounds of the present invention are also characterized as having solubilities in essentially water-immiscible liquid hydrocarbon solvents of at least 2% by weight. Correspondingly, they are further characterized in that the copper (Cu++) complexes of the compound have solubilities of at least 2% by weight in the said water-immiscible, liquid hydrocarbon solvents. Especially preferred compounds of the invention are those which exhibit solubilities of at least 2% by weight in both pure and complexed form, in aliphatic or aromatic hydrocarbons, or mixtures thereof, having flash points of at least 150° F. Thus, the compounds of the invention may preferably be further characterized as having substituents containing a sufficient number of carbon atoms and/or branching in the alkyl chains to provide at least the minimum 2% solubility in the aforementioned solvents.

The aforementioned preference for alkyl substituents containing at least 8 carbon atoms and/or possessing a branched chain structure is due to their contribution to the solubilities of the compounds in the above-described solvents. The beneficial effect provided by the number of carbon atoms is obtained by having an alkyl substituent of at least 8 carbon atoms or more than one alkyl substituent in which the sum of the carbon atoms is at least 8. Accordingly, the most preferred compounds of the present invention are those possessing one or more branched chain alkyl substituents having at least 8 carbon atoms or those possessing branched chain alkyl substituents in which the sum of the carbon atoms is at least eight.

Thus, according to preferred embodiments, the sulfonylthiosemicarbazides of the present invention have the structure:

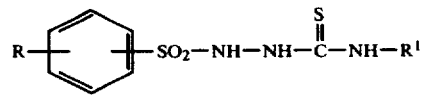

wherein R and R¹ are as previously defined and where R is alkyl containing at least 8 carbon atoms and R¹ is either phenyl or a linear or branched chain alkyl containing at least 8 carbon atoms. Of these various preferred compounds, those in which the alkyl group R is dodecyl are particularly preferred. For example, 1-(dodecylbenzenesulfonyl)-4-phenyl-3-thiosemicarbazide having the structure:

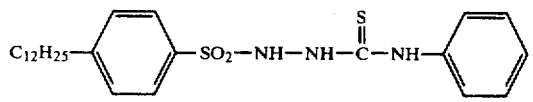

and 1-(dodecylbenzenesulfonyl)-4-t-octyl-3-thiosemicarbazide having the structure:

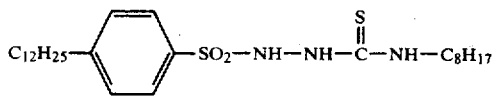

have been found to be effective extractants in liquid ion exchange processes. However, it should be understood that as the utility of the compounds of the present invention lies in their ability to extract metal values from aqueous solutions, various substituents which do not interfere with chelation may be appended to the alkyl or aryl group without departing from the scope of the invention. Illustrative of such groups are halogen, nitrile, nitro, trifluoromethyl, ester and the like.

The novel sulfonylthiosemicarbazides of the present invention are prepared by reaction of a sulfonylhydrazine with an isothiocyanate in the presence of tetrahydrofuran according to the reaction described in A. Jensen, et al, Acta Chem. Scand., 6, 195 (1952), or German Auslegeschrift No. 1,102,723 dated March 23, 1961, the disclosures of which are hereby incorporated by reference. If not commercially available as in the case of phenylisothiocyanate, the isothiocyanate, such as t-octylisothiocyanate may be prepared as described in U.S. Pat. No. 2,689,255 or in Houben Weyl, Methoden der Organishen Chemie, 4th edition, Vol. 9, p. 868, the disclosures of which are also hereby incorporated by reference. The sulfonylhydrazine may be prepared by the reaction of hydrazine with the corresponding sulfonylchloride which in turn may be prepared as described in U.S. Pat. No. 4,100,163, the disclosure of which is also incorporated by reference. Further details of the synthesis of the compounds of the present invention are found in the Examples which follow the description of the invention.

The process of the present invention is a liquid ion exchange process in which any one of the sulfonylthiosemicarbazide compounds of the invention is dissolved in an essentially water-immiscible, liquid hydrocarbon solvent and the resulting solution is contacted with a metal containing aqueous phase to extract at least a portion of the metal values into the organic phase. The phases are then separated and metal values are stripped from the loaded organic phase by use of an aqueous stripping medium.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors including the design of the solvent extraction plant (i.e., mixer-settlers, Podbielniak extractors, etc.), the value of the metal being recovered, disposal of plant effluent and the like. The process of the present invention finds particular use in the extraction recovery of the major, non-ferrous, transition metals—i.e., copper, nickel, zinc, cobalt (II) and cobalt (III), as will be described more fully hereinbelow. Essentially, all of the major plants in operation currently for the recovery of these metals (particularly Cu++) use mixer-settlers, with relatively large organic inventories and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are also essentially non-toxic and chemically inert and the costs thereof are currently within pratical ranges—i.e., normally less than one dollar (U.S.) per gallon to as low as thirty cents (U.S.) or so. Representative commercially available solvents are Kermac 470B (an aliphatic kerosene available from Kerr-McGee—Flash Point 175° F.), Chevron Ion Exchange Solvent (available from Standard Oil of California—Flash Point 195° F.), Escaid 100 and 110 (available from Exxon-Europe—Flash Point≅180° F.), Norpar 12 (available from Exxon-U.S.A.—Flash Point 160° F.), Conoco C-1214 (available from Conoco—Flash Point 160° F.), Aromatic 150 (an aromatic kerosene available from Exxon-U.S.A.—Flash Point 150° F.) and various other kerosenes and petroleum fraction available from other oil companies.

The present invention thus additionally relates to new compositions wherein the sulfonylthiosemicarbazide compounds of the invention are dissolved in the essentially water-immiscible, liquid hydrocarbon solvents described above. In this regard, liquid ion exchange reagents are often sold as solutions in organic solvents. These new compositions consists essentially of solutions of at least 2% by weight of the sulfonylthiosemicarbazides in essentially water-immisicble, liquid hydrocarbon solvents. When sold as concentrates, the solutions will preferably contain from about 25 to 75% by weight of the sulfonylthiosemicarbazides.

In the process of the present invention, the organic solvent solutions will preferably contain from about 2 to 75% by weight of the sulfonylthiosemicarbazide compounds and even more preferably from about 5 to 20% by weight thereof. Additionally, volume ratios of the organic:aqueous phase vary widely since the contacting of any quantity of the reagent solution with the metal containing aqueous phase will result in extraction of metal values into the organic phase. However, for commercial practicality, the organic:aqueous phase ratios are preferably in the range of about 5:1 to 1:5. For practical purposes, the extracting and stripping are normally conducted at ambient temperatures and pressures although higher or lower temperatures and/or pressures are entirely operable. Most advantageously, the entire process can be carried out continuously with the stripped organic solvent solution being recycled for contacting further quantities of metal containing solutions.

The present invention also relates to the metal complexes of the novel sulfonylthiosemicarbazide compounds and to the essentially water-immiscible, liquid hydrocarbon solvent solutions thereof. The solutions consist essentially of the said solvent and at least 2% by weight, and preferably less than 75% by weight, of the metal complexes. While not normally practiced in the industry, the solutions of the metal complexes can be obtained at one location and transported to another for stripping as hereinafter described. The term "metal complex" as used herein is meant to connote compositions of the novel sulfonylthiosemicarbazides with other than insignificant quantities of metal ions. Although the exact structural nature of these complexes has not been ascertained, indications are that under conditions of maximum loading, particularly with $Cu++$ and $Zn++$ metal ions, the complexes comprise the metal and sulfonylthiosemicarbazide compound generally in a molar ratio up to about 1:2. Maximum loading, however, is not required for achieving acceptable performance in liquid ion exchange processes and hence the metal complexes are generally defined as including the designated metals in more than insignificant quantites up to maximum loading.

The metal recovery process of the present invention is useful for recovery of the following metal values from their aqueous solutions: $Cu++$, $Ni++$, $Zn++$, $Co++$ and $Co+++$. These metal values are all transition metals of Groups Ib, IIb, and VIII. The extraction of these various metals from aqueous solutions depends upon a number of factors, including, for example, the concentration of the metal ion, the particular anions present, and the pH of and/or ammonia concentration in the aqueous solutions, as well as the particular sulfonylthiosemicarbazide chosen and its concentration in the organic phase. Generally, it is preferred to extract the metal values from ammoniacal solutions in which the preferred concentrations of ammonia is from about 10 to 150 g/l. However, it is understood that for each aqueous metal solution and reagent solution there will be a preferred or optimum set of extraction conditions, and those skilled in the art, based on the information given herein, especially in the examples to follow, will be able, after a limited number of trial runs, to determine such preferred or optimum conditions for the respective systems under consideration. This is equally true of the stripping operations. By the term stripping is meant the transfer of at least a portion of the metal values in the loaded organic phase to the aqueous stripping medium. The metal values so stripped are desirably recovered from the aqueous stripping medium by conventional techniques, preferably electrolysis. The volume ratios of loaded organic:aqueous stripping phase can also vary widely. However, the overall object of the process is to provide a metal containing stripping solution of known composition and concentration suitable for conventional recovery techniques such as electrolysis. Accordingly, the metal will preferably be present in higher concentrations in the aqueous stripping medium than in the starting metal containing solution. To accomplish this, the loaded organic:aqueous stripping medium phase ratio will normally be in the range of about 1:1 to 10:1. The stripping medium is preferably an aqueous mineral acid solution such as 25 to 250 g/l $H_2SO_4$.

While the process of the present invention has been described as particularly effective in extracting $Cu++$, $Ni++$, $Zn++$, $Co++$ and $Co+++$, metal values from aqueous solutions, it may also be applied to extract other chemically similar metal values, such as $Cd++$, $Hg++$, $Ag+$ and $Pb++$. The process of the invention thus provides a simple, continuous method of extracting valuable metal values from aqueous solutions. Of equal importance is the economic advantages attendant from the process which allows the extracting reagent to be stripped of metal values and recycled for subsequent loading.

To further illustrate the various objects and advantages of the present invention, the following examples are provided. It is understood that their purpose is entirely illustrative an in no way intended to limit the scope of the invention.

EXAMPLE 1

Preparation of 1-(dodecylbenzenesulfonyl)-4-phenylthiosemicarbazide

| Starting Material: | 6.8 g (0.02 mol) dodecylbenzenesulfonylhydrazine |
|---|---|
| | 2.7 g (0.02 mol) phenylisothiocyanate |
| | 25 ml tetrahydrofuran |

Phenylisothiocyanate was added with stirring to a solution of dodecylbenzenesulfonylhydrazine in tetrahydrofuran. After all the phenylisothiocyanate was added, the solution was continuously stirred at room temperature overnight. Water was added and the solution was extracted with benzene. The benzene solution was washed two times with an aqueous solution of sodium chloride, dried over magnesium sulfate, filtered and evaporated to give 8.2 g of a clear orange oil. Nuclear magnetic resonance (NMR) and infrared (IR) analysis confirmed that the product was 1-(dodecylbenzenesulfonyl)-4-phenylthiosemicarbazide.

The phenyl isothiocyanate above is commercially available. The dodecylbenzenesulfonylhydrazine was prepared from dodecylbenzenesulfonychloride as described below.

| Starting Material: | 140 g (0.41 mol) dodecylbenzenesulfonylchloride |
|---|---|
| | 28 ml (0.9 mol) 97% hydrazine |
| | 28 ml water |
| | 200 ml tetrahydrofuran |

A stirred solution of dodecylbenzenesulfonyl-chloride (prepared as described in U.S. Pat. No. 4,100,163, Example I-A from the dodecylbenzene, Ucane Alkylate 12 obtained from Union Carbide, and described as an isomeric mixture wherein the dodecyl group is mostly in the para position) in tetrahydrofuran was cooled to 5°–10° in an ice bath and a solution of hydrazine in water was added keeping the temperature below 10°. After addition was complete, the mixture was stirred with cooling for 30 min, and then transferred to a separatory funnel. The lower aqueous phase was removed and Skelly B was added to the remaining organic liquid. The combined organic solution was washed twice with brine, three times with a 6% aqueous ammonia solution and three times again with brine. The Skelly B solution was then dried over magnesium sulfate, filtered and evaporated to give 131.8 g of an orange oil. IR and NMR analysis confirmed that the product was dodecylbenzenesulfonylhydrazine.

EXAMPLE 2

Preparation of
1-(dodecylbenzenesulfonyl)-4-t-octylthio-semicarbazide

| Starting Material: | 10.2 g (0.03 mol) dodecylbenzene-sulfonylhydrazine |
|---|---|
| | 5.1 g (0.03 mol) t-octylisothiocyanate |
| | 40 ml tetrahydrofuran |

The starting materials were combined as in Example 1 and stirred at room temperature overnight. Water was added and the solution was extracted with Skelly B solvent. The Skelly B solution was washed once with an aqueous solution of sodium chloride, twice with a 10% sulfuric acid solution, once again with the sodium chloride solution, twice with sodium bicarbonate and a final time with the sodium chloride solution. The Skelly B solution was then dried over magnesium sulfate, filtered and evaporated to give 10.4 g of a light yellow syrupy substance. IR analysis confirmed the product to be 1-(dodecylbenzenesulfonyl)-4-t-octylthiosemicarbazide.

The t-octylisothiocyanate was prepared from the reaction of diisobutylene and sodium thiocyanate as follows:

| Starting Material: | 112 g (1.0 mol) diisobutylene |
|---|---|
| | 84 g (1.04 mol) sodium thiocyanate |
| | 67 g (sulfuric acid (73%) |

A vigorously stirred mixture of diisobutylene and sodium thiocyanate was cooled in an ice bath and the sulfuric acid was added dropwise keeping the temperature between 30°–40°. After addition was complete, the mixture was stirred at room temperature for 6 hours. Water (400 ml) was added, and after filtering through Celite, the layers were separated. The aqueous phase was extracted twice with Skelly B, and the Skelly B solution was combined with the organic phase. The combined organic solution was washed with brine, a sodium bicarbonate solution and again with brine. The organic solution was then dried over magnesium sulfate, filtered and evaporated to give 133.3 g of a golden liquid.

Distillation of the liquid at aspirator pressure provided two fractions:

| 1. | 47.5 g bp 55–80° |
|---|---|
| 2. | 62.7 g bp 80–81° |

Although fraction 1 may contain trace amounts of diisobutylene, IR and NMR analysis confirmed both fractions to be t-octylisothiocyanate.

EXAMPLE 3

Extraction of Metal Values

To determine the ability of a compound of the present invention to extract metal values from aqueous solutions, tests were conducted in accordance with the following procedures.

A 0.1 mol solution of 1-(dodecylbenzenesulfonyl)-4-phenylthiosemicarbazide in Solvesso 150 (an aromatic kerosene having a flash point of 150° F.) and four aqueous solutions of the following compositions were used:

| Metal | Composition |
|---|---|
| $Cu^{++}$ | 0.05 M $CuSO_4$ (3.2 g/l $Cu^{++}$), |
| | 0.4 M $NH_3$, and 0.1 M $(NH_4)_2SO_4$ |
| $Ni^{++}$ | 0.05 M $NiSO_4$ (2.0 g/l $Ni^{++}$), |
| | 0.04 M $NH_3$, and 0.1 M $(NH_4)_2SO_4$ |
| $Zn^{++}$ | 0.05 M $ZnSO_4$ (3.2 g/l $Zn^{++}$), |
| | 0.4 M $NH_3$, and 0.1 M $(NH_4)_2SO_4$ |
| $Co^{+++}$ | 0.025 M $CoSO_4$ (1.5 g/l $Co^{++}$), |
| | 1.7 M $NH_3$, and 0.1 M $(NH_4)_2CO_3$ |
| | (air oxidized to $Co^{+++}$) |

Portions of the organic solution were shaken with the four aqueous solutions at an organic:aqueous phase volume ratio of 1:1 for one hour at ambient temperature. The organic phases were then analyzed for metal content. If a third phase was present, both the organic and aqueous phases were clarified and analyzed. Table A summarizes the data obtained from the extraction test.

TABLE A

| 1-(dodecylbenzenesulfonyl)-4-phenylthiosemicarbazide in Solvesso 150* | | | |
|---|---|---|---|
| (Cu) org | (Ni) org | $(Co^{+3})$ org | (Zn) org |
| 1.19 | 2.11 | 1.01 | 2.30 |

*all concentrations are given in grams per liter

EXAMPLE 4 pH Isotherms

To determine the extent of extraction of various metal ions as a function of pH, tests were conducted as follows. Portions of a 0.1 molar solution of a particular sulfonylthiosemicarbazide in a identified essentially water-immiscible liquid hydrocarbon solvent were shaken with aqueous solutions composed of equivolumes of the following components:

Component A—0.2 M metal sulfate solution in water
Component B—Water or sulfuric acid or sodium hydroxide solutions ranging from 0.01 to 0.1 M Component B was selected in such a manner as to insure the desired pH of the aqueous raffinate. In each test, the organic solution and aqueous solution were shaken at an organic:aqueous phase volume ratio of 1:1 for one hour at ambient temperature. Subsequent analysis of the organic phase for metal content and the aqueous phase for pH generated the data contained in Tables B and C which demonstrates the degree of metal extraction as a function of the Tables, concentrations are given in grams per liter unless otherwise indicated.

TABLE B

| 1-(dodecylbenzenesulfonyl)-4-phenylthiosemicarbazide in Solvesso 150 - pH Isotherms | | | | | | | | | |
|---|---|---|---|---|---|---|---|---|---|
| [Cu] | AQ pH | [Ni] | AQ pH | [Zn] | AQ pH | $[Co^{+2}]$ | AQ pH | [Fe] | AQ pH |
| 1.58 | .81 | <.005 | .72 | <.005 | .57 | <.005 | .59 | <.005 | 1.60 |

TABLE B-continued 1-(dodecylbenzenesulfonyl)-4-phenylthiosemicarbazide in Solvesso 150 - pH Isotherms

| [Cu] | AQ pH | [Ni] | AQ pH | [Zn] | AQ pH | [Co$^{+2}$] | AQ pH | [Fe] | AQ pH |
|---|---|---|---|---|---|---|---|---|---|
| 1.71 | 1.18 | <.005 | 1.18 | <.005 | 1.23 | <.005 | 1.23 | <.005 | 2.04 |
| 2.21 | 1.65 | <.005 | 1.39 | .016 | 1.64 | <.005 | 1.76 | <.005 | 2.31 |
| 2.66 | 1.97 | <.005 | 1.51 | .020 | 2.82 | <.005 | 2.13 | .250 | 2.36 |
| 2.95 | 2.21 | .109 | 3.61 | .185 | 3.80 | .204 | 4.17 | | |
| 4.16 | 3.08 | 1.38 | 4.10 | .270 | 4.24 | .104 | 4.24 | | |
| 4.84 | 3.66 | 1.84 | 4.32 | .408 | 4.44 | .290 | 4.27 | | |
| 4.05 | 4.42 | | | 3.00 | 6.51 | 3.30 | 5.06 | | |
| 4.26 | 4.50 | | | 3.51 | 7 | | | | |
| 5.13 | 6.56 | | | 5.50 | 11 | | | | |
| 5.0 | 7.08 | | | | | | | | |

TABLE C 1-(dodecylbenzenesulfonyl)4-t-octylthiosemicarbazide in Solvesso 150 - pH Isotherms

| [Cu] | AQ pH | [Ni] | AQ pH | [Co$^{+2}$] | AQ pH | [Zn] | AQ pH | [Fe] | AQ pH |
|---|---|---|---|---|---|---|---|---|---|
| 1.02 | .58 | <.005 | .63 | <.005 | .60 | <.005 | .60 | <.005 | .59 |
| 1.25 | 1.16 | <.005 | 1.54 | <.005 | 1.61 | <.005 | 1.54 | <.005 | 1.30 |
| 1.47 | 1.73 | .081 | 4.10 | .055 | 4.45 | .070 | 4.02 | <.005 | 1.63 |
| 1.70 | 2.03 | .860 | 4.77 | .700 | 5.69 | .850 | 5.47 | .006 | 1.86 |
| 2.98 | 4.37 | 1.55 | 5.39 | 1.35 | 6.51 | 1.61 | 6.04 | .027 | 2.07 |
| | | 2.50 | 7.33 | 1.94 | 7.20 | 1.76 | 6.33 | .079 | 2.30 |

EXAMPLE 5

Ammonia Isotherms

To determine the extent of extraction of various metal ions as a function of total ammonia concentration in the aqueous phase, tests were conducted in accordance with the following procedure. Portions of a 0.1 molar solution of a particular sulfonylthiosemicarbazide compound in Solvesso 150 solvent were shaken at 1:1 organic:aqueous phase volume ratio for approximately one hour at ambient temperature with aqueous ammoniacal solutions containing a particular metal ion. The organic phase was then separated and analyzed for metal concentration, generating the data contained in Tables D and E which demonstrate the degree of metal extraction as a function of ammonia concentration for particular reagent systems. In the Tables, all concentrations are given in grams per liter.

TABLE D 1-(dodecylbenzenesulfonyl)-4-phenylthiosemicarbazide in Solvesso 150 - Ammonia Isotherms

| [NH$_3$] | [Cu] AQ feed | [Cu*] org | % Extraction | [NH$_3$] | [Ni] AQ feed | [Ni*] org | % Extraction |
|---|---|---|---|---|---|---|---|
| 15.1 | .316 | .316 | 100 | 15.0 | .347 | .347 | 100 |
| 29.9 | .311 | .311 | 100 | 30.0 | .357 | .357 | 100 |
| 55.4 | .316 | .316 | 100 | 60.0 | .359 | .359 | 100 |
| 85.1 | .314 | .314 | 100 | 84.5 | .369 | .369 | 100 |
| 104.0 | .320 | .320 | 100 | 118.6 | .378 | .378 | 100 |
| 132.0 | .343 | .343 | 100 | 149.6 | .374 | .374 | 100 |

| [NH$_3$] | [Co] AQ feed | [Co*] org | % Extrac. | [NH$_3$] | [Zn] AQ feed | [Zn*] org | % Extrac. |
|---|---|---|---|---|---|---|---|
| 14.7 | .305 | .305 | 100 | 14.4 | .330 | .330 | 100 |
| 29.7 | .303 | .303 | 100 | 28.9 | .332 | .332 | 100 |
| 56.7 | .302 | .302 | 100 | 58.3 | .332 | .332 | 100 |
| 77.6 | .301 | .301 | 100 | 87.2 | .332 | .332 | 100 |
| 102.6 | .309 | .309 | 100 | 116.2 | .331 | .331 | 100 |
| 129.2 | .294 | .294 | 100 | 147.0 | .331 | .331 | 100 |

*Precipitation caused poor phase separation. Aqueous raffinate was analyzed and the concentration of metal in the organic phase was determined by difference.

TABLE E 1-(dodecylbenzenesulfonyl)-4-t-octylthiosemicarbazide in Solvesso 150 - Ammonia Isotherms

| [NH$_3$] | [Cu] AQ feed | [Cu] org | % Extraction | [NH$_3$] | [Ni] AQ feed | [Ni] org | % Extraction |
|---|---|---|---|---|---|---|---|
| 15.1 | .316 | .337 | 100 | 15.1 | .347 | .252 | 73 |
| 29.9 | .311 | .336 | 100 | 30.0 | .357 | .199 | 56 |
| 55.4 | .316 | .334 | 100 | 60.0 | .359 | .145 | 40 |
| 85.1 | .314 | .100 | 32 | 89.5 | .369 | .085 | 23 |
| 104.0 | .320 | .070 | 22 | 118.6 | .378 | .061 | 16 |
| 132.0 | .343 | .060 | 17 | 149.6 | .374 | .050 | 13 |

| [NH$_3$] | [Co] AQ feed | [Co] org | % Extrac. | [NH$_3$] | [Zn] AQ feed | [Zn] org | % Extrac. |
|---|---|---|---|---|---|---|---|
| 15.3 | .274 | .271 | 99 | 14.4 | .330 | .360 | 100 |
| 30.6 | .276 | .268 | 97 | 28.9 | .332 | .287 | 86 |
| 61.2 | .276 | .268 | 97 | 58.3 | .332 | .188 | 57 |
| 91.8 | .274 | .270 | 98 | 87.2 | .332 | .100 | 30 |
| 122.4 | .276 | .270 | 98 | 116.2 | .331 | .055 | 17 |
| 153.0 | .274 | .250 | 91 | 147.0 | .331 | .030 | 9 |

EXAMPLE 6

Acid Stripping, Ammonia Loading and Acid Loading

In order to determine (1) the extent of metal stripping as a function of acid concentration, (2) the extent of ammonia loading during extraction and (3) the extent of acid loading during stripping, the following tests were conducted. A 0.1 M solution of 1-(dodecylbenzenesulfonyl)-4-t-octylthiosemicarbazide in Solvesso 150 and aqueous solutions having the following compositions were prepared.

(A) a 0.1 M copper sulfate, 0.6 M NH$_3$ and 0.15 M (NH$_4$)$_2$SO$_4$ solution in water.

(B) 0, 25, 50, 100 and 150 gpl H$_2$SO$_4$ solutions in water.

In the first step, the reagent solution was shaken with aqueous solution A at an organic:aqueous phase volume ratio of 1:2 for one hour at ambient temperature. The phases were separated and the loaded organic phase was contacted a second time as before with fresh aqueous solution A. The resulting organic phase was separated and analyzed for metal concentration. The loaded organic phase was then shaken with solution B at an organic:aqueous phase ratio of 1:1 for one hour at ambient temperature. The phases were then separated and the organic was analyzed for metal content while the aqueous phase was analyzed for ammonia concentration. Next, the stripped organic phase was washed with water at an organic:aqueous phase ratio of 1:1 for one hour and analyzed for H₂SO₄ concentration. The results of this procedure are disclosed in Table F.

TABLE F 1-(dodecylbenzenesulfonyl)-4-t-octylthiosemicarbazide in Solvesso 150 - Cu Stripping

| Metal | Acid Concentration (g/l) | | | | |
|---|---|---|---|---|---|
| | 0 | 25 | 50 | 100 | 150 |
| [Cu] | 2.10 | .415 | .292 | .286 | .303 |
| % Stripping | 0 | 80 | 86 | 86 | 86 |
| [NH₃]AQ Strip | — | 2.2 | 2.5 | 2.7 | 2.7 |
| pH AQ Scrub | — | 2.28 | 2.07 | 2.07 | 1.98 |

All concentrations are in g/l.

While the present invention has now been described and illustrated in terms of various preferred embodiments, those of skill in the art will readily appreciate that various modifications, changes, omissions, and substitutions may be made without departing from the spirit thereof. It is intended, therefore, that the present invention be limited solely by the scope of the following claims.

What is claimed is:

1. Compounds of the structure:

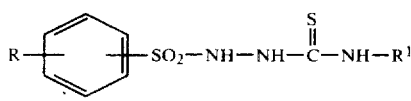

wherein R is a linear or branched chain alkyl group containing at least 8 carbon atoms, and R¹ is selected from the group consisting of alkyl, aryl, alkaryl and aralkyl, in which the alkyl groups are linear or branched chain containing from 1 to 20 carbon atoms, said compounds being further characterized as having solubilities of at least 2% by weight in essentially water-immiscible, liquid hydrocarbon solvents.

2. The compounds of claim 1, wherein said liquid hydrocarbon solvent is selected from the group consisting of aliphatic and aromatic hydrocarbons and mixtures thereof having flash points of at least 150° F. and further characterized in that the Cu⁺⁺ complexes thereof also have solubilities of at least 2% by weight in said liquid hydrocarbon solvents.

3. The compounds of claim 1, wherein R¹ is phenyl or an alkyl group containing at least 8 carbon atoms.

4. The compounds of claim 1, wherein R or R¹ contains election-withdrawing substituents selected from the group consisting of halogen, ester, nitro and nitrile.

5. The compounds of claim 1, wherein R is dodecyl.

6. The compounds of claim 1, wherein R¹ is a branched chain alkyl containing 8 carbon atoms.

7. 1-(dodecylbenzenesulfonyl)-4-phenyl-3-thiosemicarbazide.

8. 1-(dodecylbenzenesulfonyl)-4-t-octyl-3-thiosemicarbazide.

9. A composition of matter consisting essentially of a solution of a sulfonylthiosemicarbazide in an essentially water-immiscible, liquid hydrocarbon solvent, said solution containing at least 2% by weight of said sulfonylthiosemicarbazide, said sulfonylthiosemicarbazide being selected from compounds of the structure:

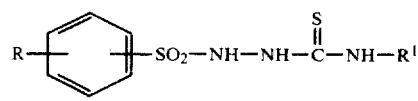

wherein R is a linear or branched chain alkyl group containing at least 8 carbon atoms and R¹ is selected from the group consisting of alkyl, aryl, alkaryl and aralkyl, in which the alkyl groups are linear or branched chain containing from 1 to 20 carbon atoms.

10. The composition of claim 9, wherein said solvent is selected from the group consisting of aliphatic and aromatic hydrocarbons and mixtures thereof, having flash points of at least 150° F. and further characterized in that the Cu⁺⁺ complexes of the sulfonylthiosemicarbazides have a solubility in said solvent of at least 2% by weight.

11. The composition of claim 9, wherein said solvent is selected from the group consisting of aliphatic and aromatic kerosenes, benzene, toluene and xylene.

12. The composition of claim 9, wherein said sulfonylthiosemicarbazide is present in an amount of about 2 to 75% by weight.

13. The composition of claim 9, wherein R¹ is phenyl or an alkyl group containing at least 8 carbon atoms.

14. The composition of claim 9, wherein R¹ is a branched chain alkyl containing 8 carbon atoms.

15. The composition of claim 9, wherein R is dodecyl.

16. The composition of claim 9, wherein said sulfonylthiosemicarbazide is selected from the group consisting of 1-(dodecylbenzenesulfonyl)-4-phenyl-3-thiosemicarbazide and 1-(dodecylbenzenesulfonyl)-4-t-octyl-3-thiosemicarbazide.

17. The composition of claim 16, wherein said sulfonylthiosemicarbazide is present in an amount of from 25 to 75% by weight.

18. The composition of claim 9, wherein said composition additionally contains an amount of a metal complex of said sulfonylthiosemicarbazide and a metal ion selected from the group consisting of Cu⁺⁺, Ni⁺⁺, Co⁺⁺, Co⁺⁺⁺, and Zn⁺⁺.

19. The composition of claim 18, wherein the metal ion and the sulfonylthiosemicarbazide are present in a molar ratio up to about 1:2.

20. The composition of claim 18, wherein said metal ion is Cu⁺⁺.

* * * * *